US012650750B2

(12) United States Patent
Yamada

(10) Patent No.: US 12,650,750 B2
(45) Date of Patent: Jun. 9, 2026

(54) CAPACITIVE DETECTION DEVICE

(71) Applicant: Alps Alpine Co., Ltd., Tokyo (JP)

(72) Inventor: Tomoki Yamada, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 18/910,469

(22) Filed: Oct. 9, 2024

(65) Prior Publication Data

US 2025/0028420 A1    Jan. 23, 2025

Related U.S. Application Data

(63) Continuation of application No. PCT/JP2023/007312, filed on Feb. 28, 2023.

(30) Foreign Application Priority Data

May 16, 2022    (JP) ................................. 2022-080013

(51) Int. Cl.
G06F 3/044          (2006.01)

(52) U.S. Cl.
CPC .......... G06F 3/0446 (2019.05); G06F 3/0443 (2019.05); G06F 2203/04107 (2013.01)

(58) Field of Classification Search
None
See application file for complete search history.

(56) References Cited

U.S. PATENT DOCUMENTS

2016/0148034 A1*  5/2016  Kremin .............. G06V 40/1306
                                                                  382/124
2017/0300166 A1* 10/2017  Rosenberg ............ G06F 3/0443

2019/0101998 A1*  4/2019  Peng ................... G02F 1/13338
2019/0102010 A1*  4/2019  Knabenshue ......... G06F 3/0442
2019/0220115 A1   7/2019  Mori et al.
2019/0294297 A1*  9/2019  Sasai .................... H03K 17/955
2020/0225269 A1*  7/2020  Fujiyoshi ............... E05B 81/77

FOREIGN PATENT DOCUMENTS

JP          2019-125218         7/2019
JP          2019-149207         9/2019
JP          2022-066900         5/2022
WO          2018/116706         6/2018

OTHER PUBLICATIONS

International Search Report from International Application No. PCT/JP2023/007312 dated Apr. 25, 2023, with English translation.

* cited by examiner

*Primary Examiner* — Christopher R Lamb
(74) *Attorney, Agent, or Firm* — Beyer Law Group LLP

(57)          ABSTRACT

A capacitive detection device includes a sensor electrode, a shield electrode, a first voltage output unit configured to output a first alternating current voltage, a second voltage output unit configured to apply, to the shield electrode, a second alternating current voltage having a same frequency and phase as the first alternating current voltage and amplitude larger than that of the first alternating current voltage, a detection unit, an adjustment electrode, and a voltage setting configured to output, to the adjustment electrode, a third alternating current voltage having a same frequency and phase as the first alternating current voltage and amplitude smaller than that of the first alternating current voltage or a third alternating current voltage having a same frequency as the first alternating current voltage and a phase opposite to that of the first alternating current voltage or configured to set the adjustment electrode to a fixed potential.

16 Claims, 6 Drawing Sheets

110

111  111A    115A

III    III

114A

Y
Z    X

110

115B

112A

III    III 113
112
113A
114B

112B

Y
Z    X

CAPACITIVE DETECTION DEVICE

CLAIM OF PRIORITY

This application is a Continuation of International Application No. PCT/JP2023/007312 filed on Feb. 28, 2023, which claims benefit of Japanese Patent Application No. 2022-080013 filed on May 16, 2022. The entire contents of each application noted above are hereby incorporated by reference.

BACKGROUND OF THE INVENTION

1. Field of the Invention

The present invention relates to a capacitive detection device.

2. Description of the Related Art

Approach/contact sensors (capacitive detection devices) in which, in addition to an upper electrode (sensor electrode) and a lower electrode, a shield electrode is provided around the lower electrode and a ground electrode is provided around the shield electrode and that are capable of measuring capacitance of the lower electrode without being affected by surrounding elements are known (e.g., see Japanese Unexamined Patent Application Publication No. 2019-149207).

SUMMARY OF THE INVENTION

With respect to capacitive detection devices that apply different voltages to a sensor electrode and a shield electrode, however, how to suppress an effect of drift in detected capacitance due to changes in an environment including temperature and humidity has not been disclosed.

The present invention, therefore, provides a capacitive detection device capable of suppressing an effect of temperature drift in capacitance.

A capacitive detection device according to an embodiment of the present disclosure includes a sensor electrode, a shield electrode arranged in proximity to the sensor electrode, a first voltage output unit that outputs a first alternating current voltage to the sensor electrode, a second voltage output unit that applies, to the shield electrode, a second alternating current voltage having a same frequency and phase as the first alternating current voltage and amplitude larger than amplitude of the first alternating current voltage, a detection unit that detects a self-capacitance of the sensor electrode, an adjustment electrode arranged in proximity to the sensor electrode, and a voltage setting unit that outputs, to the adjustment electrode, a third alternating current voltage having a same frequency as the first alternating current voltage, a same phase as the first alternating current voltage, and amplitude smaller than the amplitude of the first alternating current voltage or a third alternating current voltage having a same frequency as the first alternating current voltage and a phase opposite to a phase of the first alternating current voltage or that sets the adjustment electrode to a fixed potential.

A capacitive detection device capable of suppressing an effect of drift in capacitance due to changes in an environment including temperature and humidity can be provided.

DESCRIPTION OF THE PREFERRED EMBODIMENTS

An embodiment to which a capacitive detection device in the present disclosure is applied will be described hereinafter.

EMBODIMENT

Figure 1:
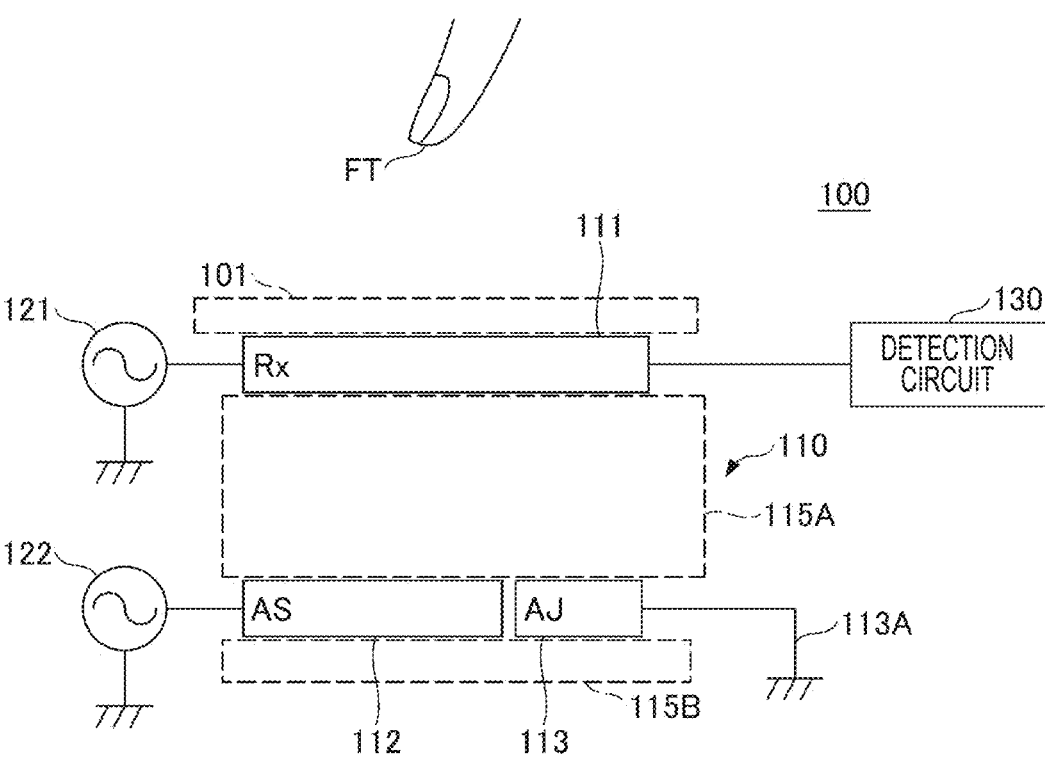
FIG. 1 is a diagram illustrating a capacitive detection device according to an embodiment.
Figure 1:
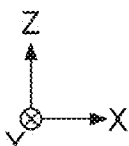

FIG. 1 is a diagram illustrating a capacitive detection device 100 according to the embodiment. An XYZ coordinate system will be defined and described hereinafter. Although a −Z direction will be referred to as downward or down and a +Z direction will be referred to as upward or up for convenience of description, these terms do not express a universal vertical relationship. Viewing in an XY plane will be referred to as plan view.

The capacitive detection device 100 includes a top panel 101, a sensor unit 110, alternating current voltage output units 121 and 122, and a detection circuit 130. The alternating current voltage output unit 121 is an example of a first voltage output unit, the alternating current voltage output unit 122 is an example of a second voltage output unit, and the detection circuit 130 is an example of a detection unit.

The capacitive detection device 100 detects approach or contact of a body part, such as a hand, to or with the top panel 101. An upper surface of the top panel 101 is an operation surface of an input device or the like including the capacitive detection device 100. The body part such as a hand is an example of a target to be detected by the capacitive detection device 100. A case where a user brings one of his/her fingertips FT close to the top panel 101 will be described hereinafter. Although a mode in which the top panel 101 is a component of the capacitive detection device 100 will be described here, the top panel 101 may be a component of the input device including the capacitive detection device 100, instead.

The sensor unit 110 includes sensor electrodes (Rx) 111, a shield electrode (AS) 112, adjustment electrodes (AJ) 113, and insulation layers 115A and 115B. The sensor unit 110 is achieved, for example, by a wiring board having a multilayer structure in which the insulation layer 115B, the shield electrode 112 and the adjustment electrodes 113, the insulation layer 115A, and the sensor electrodes 111 are stacked in this order from a bottom to a top.

The shield electrode 112 and the adjustment electrodes 113 are provided on a second surface of the insulation layer 115A, which is opposite a first surface in the +Z direction.

The shield electrode 112 and the adjustment electrodes 113 are provided in the −Z direction (second side) of the sensor electrodes 111, which is opposite the +Z direction (first side), in which the fingertip FT approaches the sensor electrodes 111. Because the insulation layer 115A is extremely thin, the shield electrode 112 and the adjustment electrodes 113 are provided close to the sensor electrodes 111.

Figure 2A:
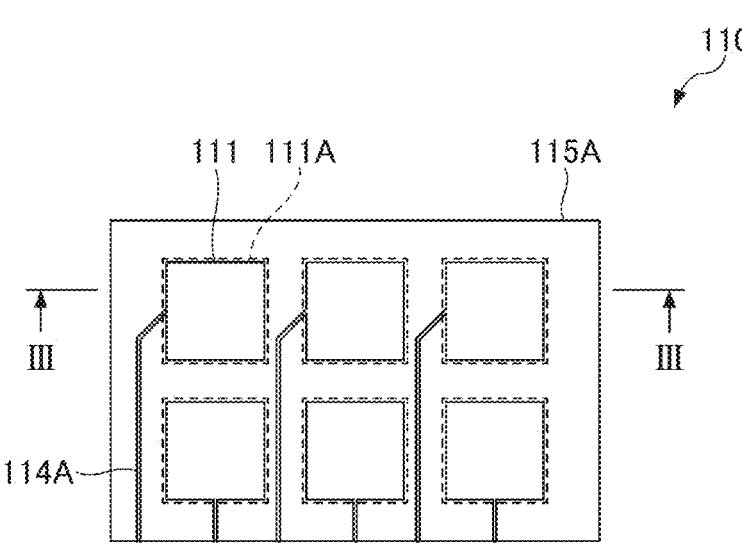
FIG. 2A is a diagram illustrating a planar configuration of a part of a sensor unit including a sensor electrode and an insulation layer.
Figure 2A:
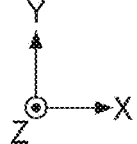
Figure 2B:
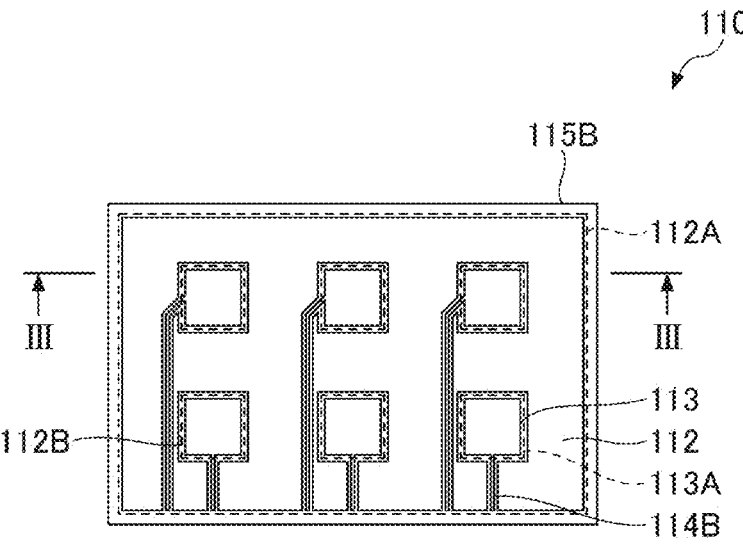
FIG. 2B is a diagram illustrating a planar configuration of a part of the sensor unit including a shield electrode, adjustment electrodes, and an insulation layer.
Figure 2B:
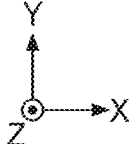
Figure 3:
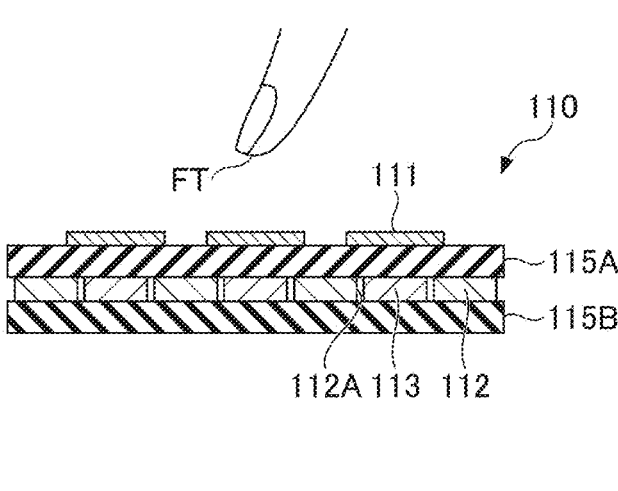
FIG. 3 is a diagram illustrating a cross-sectional configuration of the sensor unit 110.

The following description refers to FIGS. 2A, 2B, and 3 in addition to FIG. 1. FIG. 2A is a diagram illustrating a planar configuration of a part of the sensor unit 110 including the sensor electrodes 111 and the insulation layer 115A. FIG. 2B is a diagram illustrating a planar configuration of a part of the sensor unit 110 including the shield electrode 112, the adjustment electrodes 113, and the insulation layer 115B. FIG. 2A illustrates six sensor electrodes 111, and FIG. 2B illustrates one shield electrode 112 and six adjustment electrodes 113. The sensor electrodes 111 are included in a first layer of the wiring board for achieving the sensor unit 110. The shield electrode 112 and the adjustment electrodes 113 are included in a second layer of the wiring board for achieving the sensor unit 110. The shield electrode 112 and the adjustment electrodes 113, therefore, are provided in the same layer different from that in which the sensor electrodes 111 is provided. The insulation layer 115A illustrated in FIG. 2A and the insulation layer 115B illustrated in FIG. 2B are the same in terms of size in plan view (length in an X direction and length in a Y direction).

FIG. 3 is a diagram illustrating a cross-sectional configuration of the sensor unit 110. A cross-section in FIG. 3 corresponds to a cross-section taken along an arrow III-III in FIG. 2A and a cross-section taken along an arrow III-III in FIG. 2B. A part illustrated in FIG. 1 corresponds to a part of the cross-section in FIG. 3 including one shield electrode 112 and one adjustment electrode 113.

In an example, the sensor unit 110 includes six sensor electrodes 111 (refer to FIG. 2A), one shield electrode 112 (refer to FIG. 2B), and six adjustment electrodes 113 (refer to FIG. 2B).

As illustrated in FIG. 2A, the six sensor electrodes 111 are arranged in a matrix of two rows and three columns as an example. A wire 114A is connected to each sensor electrode 111. The sensor electrode 111 is an electrode that detects capacitance in relation to the fingertip FT by a self-capacitance method, and is fabricated using a conductive material such as an ITO (indium tin oxide) film, a zinc oxide, a tin oxide, or a titanium oxide. When the sensor electrodes 111 are fabricated using an ITO film, the insulation layer 115A may be a transparent substrate.

The sensor electrodes 111 are connected to the alternating current voltage output unit 121 and the detection circuit 130 through the wires 114A (refer to FIG. 2A). Although FIG. 1 illustrates one sensor electrode 111, there are actually six sensor electrodes 111 as illustrated in FIG. 2A. For this reason, a selection unit such as a multiplexer may be provided, for example, between the six sensor electrodes 111 and the one alternating current voltage output unit 121 and between the six sensor electrodes 111 and the one detection circuit 130 and establish connection in a time-division manner. When detecting the capacitance in relation to the fingertip FT using the self-capacitance method, each sensor electrode 111 is connected to the detection circuit 130, and is also connected to the alternating current voltage output unit 121 and receives an alternating current voltage. The alternating current voltage applied from the alternating current voltage output unit 121 to each sensor electrode 111 is an example of a first alternating current voltage.

As illustrated in FIG. 1, the shield electrode 112 is connected to the alternating current voltage output unit 122, and when each sensor electrode 111 detects the capacitance in relation to the fingertip FT using the self-capacitance method, receives an alternating current voltage. The alternating current voltage applied from the alternating current voltage output unit 122 to the shield electrode 112 is an example of a second alternating current voltage. The shield electrode 112 is fabricated using a conductive material such as an ITO film, a zinc oxide, a tin oxide, or a titanium oxide. When the sensor electrodes 111 are an ITO film, the shield electrode 112 and the adjustment electrodes 113 may be fabricated using ITO films, and the insulation layers 115A and 115B may be transparent substrates.

In an example, the alternating current voltage applied from the alternating current voltage output unit 121 to each sensor electrode 111 and the alternating current voltage applied from the alternating current voltage output unit 122 to the shield electrode 112 have the same frequency and phase. In this case, amplitude Vas of the alternating current voltage applied from the alternating current voltage output unit 122 to the shield electrode 112 is larger than amplitude Vrx of the alternating current voltage applied from the alternating current voltage output unit 121 to each sensor electrode 111. Since the alternating current voltage applied from the alternating current voltage output unit 121 to each sensor electrode 111 and the alternating current voltage applied from the alternating current voltage output unit 122 to the shield electrode 112 have the same frequency and phase, one alternating current voltage output unit may be used instead of the alternating current voltage output unit 121 and the alternating current voltage output unit 122, and a variable-gain amplifier may be provided between the alternating current voltage output unit and the sensor electrodes 111 and another variable-gain amplifier may be provided between the alternating current voltage output unit and the shield electrode 112 to adjust an amplification ratio such that the amplitude Vas becomes larger than the amplitude Vrx.

In plan view, a rectangular outer edge of the shield electrode 112 illustrated in FIG. 2B includes rectangular outer edges of the six sensor electrodes 111 illustrated in FIG. 2A. A first area 111A in which each sensor electrode 111 is provided is located within (inside) a second area 112A in which the shield electrode 112 is provided. Although the first areas 111A are illustrated outside the outer edges of the corresponding sensor electrodes 111 for the sake of clarity, the outer edges of the first areas 111A match the outer edges of the corresponding sensor electrodes 111. Similarly, although the second area 112A is illustrated outside the outer edge of the shield electrode 112, the outer edge of the second area 112A matches the outer edge of the shield electrode 112. Since the six adjustment electrodes 113 are arranged inside the rectangular outer edge of the shield electrode 112, the shield electrode 112 includes non-forming parts 112B patterned in such a way as to avoid the six adjustment electrodes 113.

As illustrated in FIG. 1, the adjustment electrodes 113 are grounded through wires 114B. The wires 114B are examples of a voltage setting unit that sets the adjustment electrode 113 to a ground potential as a fixed potential. Although the six adjustment electrodes 113 are provided in practice as illustrated in FIG. 2B, all the adjustment electrodes 113 are grounded through the wires 114B. In an example, the adjustment electrodes 113 are fabricated using a conductive material such as an ITO film, a zinc oxide, a tin oxide, or a titanium oxide. When the sensor electrodes 111 are an ITO film, the adjustment electrodes 113 and the shield electrode 112 may be fabricated using ITO films, and the insulation layers 115A and 115B may be transparent substrates.

In plan view, the adjustment electrodes 113 are provided inside the rectangular outer edge of the shield electrode 112 and arranged in such a way as to be stored inside the outer edges of the corresponding sensor electrodes 111 as illustrated in FIG. 2B. In plan view, the adjustment electrodes 113 are smaller than the sensor electrodes 111. In plan view, six third areas 113A in which the six adjustment electrodes 113 are provided are located inside the six first areas 111A in which the six sensor electrodes 111 are provided. Although the third areas 113A are illustrated outside outer edges of the adjustment electrodes 113 for the sake of clarity, the outer edges of the third areas 113A match the outer edges of the adjustment electrodes 113. Since all the sensor electrodes 111 are arranged inside the rectangular outer edge of the shield electrode 112 in plan view, all the third areas 113A in which all the adjustment electrodes 113 are arranged are located within (inside) the second area in which the shield electrode 112 is arranged. Details of functions of the adjustment electrodes 113 will be described later.

The alternating current voltage output units 121 and 122 are alternating current voltage sources that output alternating current voltages to be applied to the sensor electrodes 111 and the shield electrode 112, respectively. The alternating current voltage output unit 121 applies, in a time-division manner, an alternating current voltage of the amplitude Vrx to a sensor electrode 111 selected by a multiplexer or the like that is not illustrated. The alternating current voltage output unit 122 applies an alternating current voltage of the amplitude Vas to the shield electrode 112. The amplitude Vas is larger than the amplitude Vrx. That is, an alternating current voltage having amplitude larger than that for the sensor electrodes 111 is applied to the shield electrode 112.

The detection circuit 130 detects self-capacitances of the connected sensor electrodes 111. More specifically, the detection circuit 130 detects capacitance between each sensor electrode 111 and the fingertip FT in a time-division manner. The detection circuit 130 can detect XY coordinates and a Z coordinate of the fingertip FT with the fingertip FT in proximity to the top panel 101 and the XY coordinates of the fingertip FT with the fingertip FT in contact with the top panel 101. Proximity refers to a state where the operation surface of the top panel 101 and the fingertip FT are not in contact with each other but it can be determined on the basis of the capacitance between each sensor electrode 111 and the fingertip FT that the fingertip FT is close to the operation surface.

Methods for Detecting Capacitance

Methods for detecting capacitance will be described here with reference to FIGS. 4A, 4B, and 4C. What is illustrated in FIGS. 4A, 4B, and 4C describes not the related art but principles of the detection methods.

Figure 4A:
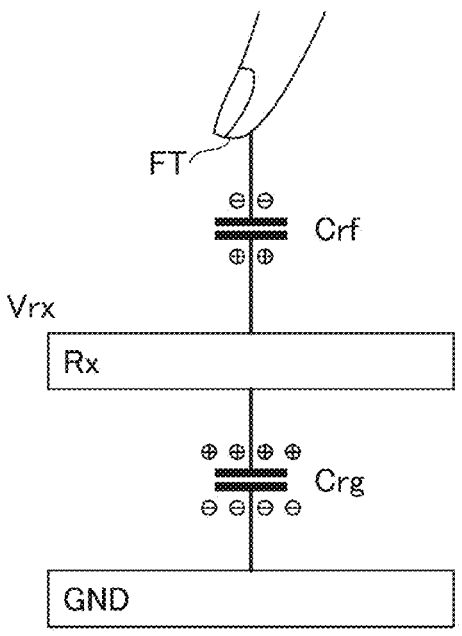
FIG. 4A is a diagram illustrating self-capacitance detection.
Figure 4B:
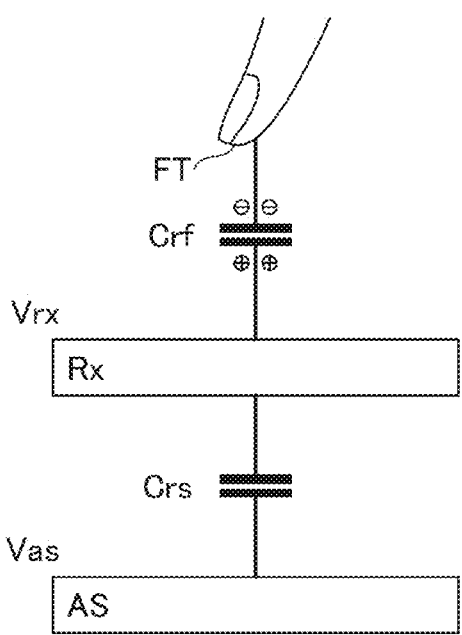
FIG. 4B is a diagram illustrating absolute self-capacitance detection.
Figure 4C:
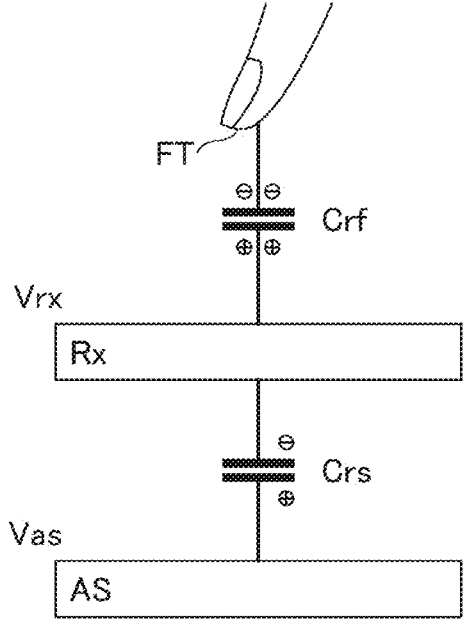
FIG. 4C is another diagram illustrating the absolute self-capacitance detection.

FIG. 4A is a diagram illustrating a self-capacitance method for detecting capacitance (self-capacitance detection). FIG. 4A is a diagram illustrating a state where the capacitance of the fingertip FT is detected by a self-capacitance method using only the sensor electrode Rx without using a shield electrode. It can be essentially considered that there is a capacitor Crf of coupling capacitance Crf between the fingertip FT and the sensor electrode Rx and there is a capacitor Crg of coupling capacitance Crg between the sensor electrode Rx and ground GND. When a position of the fingertip FT relative to the sensor electrode Rx changes, the coupling capacitance Crf changes. A main purpose of a self-capacitance detection sensor is to detect the capacitance Crf as a value and measure a positional relationship between the sensor electrode Rx and the fingertip FT.

When an alternating current voltage of the amplitude Vrx is applied to the sensor electrode Rx and a potential of the sensor electrode Rx is Vrx, positive charge is generated in an electrode of the capacitor Crg on a sensor electrode Rx side, and negative charge is generated in an electrode on a ground GND side. At this time, negative charge is generated in an electrode of the capacitor Crf on a fingertip FT side, and positive charge is generated in an electrode on the sensor electrode Rx side.

In the self-capacitance detection illustrated in FIG. 4A, a value proportional to the charge generated on the sensor electrode Rx side, that is, a value proportional to Crf+Crg, is detected. Because the capacitance of the capacitor Crg mainly consists of base capacitance including capacitance between metals in a wiring board and capacitance between electrodes in the touch panel, drift is caused in the base capacitance due to changes in an environment, it is not easy to accurately detect the capacitance Crf between the fingertip FT and the sensor electrode Rx.

FIG. 4B is a diagram illustrating an absolute self-capacitance method for detecting capacitance (absolute self-capacitance detection). FIG. 4B is a diagram illustrating a state where the capacitance of the fingertip FT is detected by an absolute self-capacitance method using the sensor electrode Rx and the shield electrode AS. It can be essentially considered that there is a capacitor Crf of coupling capacitance Crf between the fingertip FT and the sensor electrode Rx and there is a capacitor Crs of coupling capacitance Crs between the sensor electrode Rx and the shield electrode AS. Frequency, amplitude Vrx, and a phase of an alternating current voltage applied to the sensor electrode Rx are the same as frequency, amplitude Vas, and a phase of an alternating current voltage applied to the shield electrode AS.

Since no charge is generated in the capacitor Crs when the frequency, the amplitude Vrx, and the phase of the alternating current voltage applied to the sensor electrode Rx and the frequency, the amplitude Vas, and the phase of the alternating current voltage applied to the shield electrode AS are the same, an effect of the ground GND is eliminated, and the capacitance between the fingertip FT and the sensor electrode Rx can be accurately detected.

FIG. 4C is a diagram illustrating another absolute self-capacitance method for detecting capacitance (absolute self-capacitance detection). The absolute self-capacitance detection illustrated in FIG. 4C is different from that illustrated in FIG. 4B in that although frequency and a phase of an alternating current voltage applied to the sensor electrode Rx and frequency and a phase of an alternating current voltage applied to the shield electrode AS are the same, the amplitude Vas of the alternating current voltage applied to the shield electrode AS is larger than the amplitude Vrx of the alternating current voltage applied to the sensor electrode Rx.

Since the amplitude Vas of the alternating current voltage applied to the shield electrode AS is different from the amplitude Vrx of the alternating current voltage applied to the sensor electrode Rx, positive charge and negative charge are generated in two electrodes of the capacitor Crs, respectively. When positive charge and negative charge are present in the two electrodes of the capacitor Crs, detection of the position of the fingertip FT is affected although the effect is smaller than in the self-capacitance detection illustrated in FIG. 4A, and drift is slightly caused due to changes in an environment.

Figure 5:
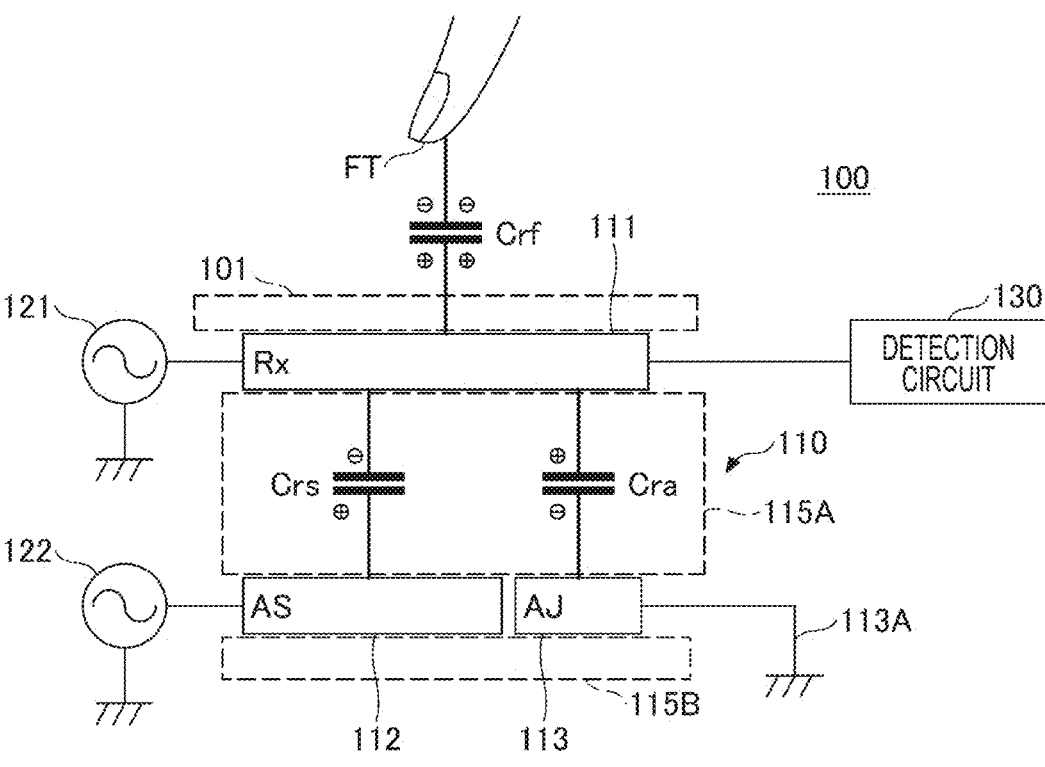
FIG. 5 is a diagram illustrating absolute self-capacitance detection according to the embodiment.
Figure 5:
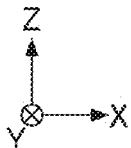

The capacitive detection device 100 according to the embodiment suppresses drift due to changes in an environment while assuming that the amplitude Vas of the alternating current voltage applied to the shield electrode 112 and the amplitude Vrx of the alternating current voltage applied to the sensor electrodes 111 are different from each other. This will be described here with reference to FIG. 5, which is obtained by adding plus and minus signs to FIG. 1. FIG. 5 is a diagram illustrating absolute self-capacitance detection according to the embodiment.

As illustrated in FIG. 5, in the capacitive detection device 100 including the adjustment electrodes (AJ) 113, the amplitude of the alternating current voltage applied to the sensor electrodes (Rx) 111 is denoted by Vrx, the amplitude of the alternating current voltage applied to the shield electrode (AS) 112 is denoted by Vas, the fixed potential of the adjustment electrodes (AJ) 113 is denoted by Va, the coupling capacitance between the sensor electrodes 111 and the shield electrode 112 is denoted by Crs, and coupling capacitance between the sensor electrodes 111 and the adjustment electrodes 113 is denoted by Cra. The capacitor of the coupling capacitance Crs will be referred to as a capacitor Crs, and a capacitor of the coupling capacitance Cra will be referred to as a capacitor Cra in the following description. The fixed potential of the adjustment electrodes 113, which is denoted by Va, is 0 V here.

Since the amplitude Vas of the alternating current voltage applied to the shield electrode 112 is larger than the amplitude Vrx of the alternating current voltage applied to the sensor electrodes 111, positive charge is generated in an electrode (lower electrode) of the capacitor Crs on a shield electrode 112 side, and negative charge is generated in an electrode (upper electrode) of the capacitor Crs on a sensor electrodes 111 side. Conversely, since the amplitude (0 V because of GND) of the alternating current voltage applied to the adjustment electrodes 113 is smaller than the alternating current voltage Vrx applied to the sensor electrodes 111, positive charge is generated in an electrode (upper electrode) of the capacitor Cra on the sensor electrodes 111 side, and negative charge is generated in an electrode (lower electrode) of the capacitor Cra on an adjustment electrodes 113 side. Positive charge is generated in an electrode (lower electrode) of the capacitor Crf on the sensor electrodes Rx 111 side, and negative charge is generated in an electrode (upper electrode) of the capacitor Crf on a fingertip FT side.

When the charges of the capacitors Crs and Cra cancel each other, a value proportional only to the charge (capacitance) of the capacitor Crf can be detected. For this purpose, the sum of the negative charge in the electrode (upper electrode) of the capacitor Crs on the sensor electrodes 111 side and the positive charge in the electrode (upper electrode) of the capacitor Cra on the sensor electrodes 111 side needs to be zero, that is, the following Expression (1) needs to be satisfied.

$$Crs \times (Vas - Vrx) = Cra \times (Vrx - Va) \qquad (1)$$

When Expression (1) is satisfied, the charges of the capacitors Crs and Cra cancel each other, and charge is not generated between the sensor electrodes 111 and both the shield electrode 112 and the adjustment electrodes 113. This is the same state as when no charge is generated in the capacitor Crs in FIG. 4B.

Even when the condition of Expression (1) for not generating charge between the sensor electrodes 111 and both the shield electrode 112 and the adjustment electrodes 113 is not perfectly satisfied, an effect of canceling the charges of the capacitors Crs and Cra can be produced using a value close to a value of Cra that satisfies Expression (1).

With respect to the coupling capacitance Cra, when it is said that the coupling capacitance Cra determined on the basis of the relational expression of Expression (1) is achieved between the sensor electrodes 111 and the adjustment electrodes 113, therefore, a value slightly different from the value obtained from Expression (1) may be set.

When Vrx=0.95 Vas, for example, Crs:Cra=0.95×Vas: 0.05×Vas, and Crs:Cra=19:1. The sensor electrodes 111, the shield electrode 112, and the adjustment electrodes 113 may be designed while obtaining the coupling capacitance Cra that satisfies this ratio from Expression (1). Since the capacitors Crs and Cra are present in one wiring board and inter-electrode distances are the same, the relationship of Crs:Cra=19:1 can be easily achieved on the basis of a ratio of area of the capacitors Crs and Cra.

Setting a value slightly different from the value obtained from Expression (1) described above is, for example, making Cra in the ratio of Crs:Cra=19:1 obtained from Expression (1) smaller than 1, which is achieved, for example, by changing the area ratio.

Effects

As described above, the capacitive detection device 100 includes the sensor electrodes 111, the shield electrode 112 arranged close to the sensor electrodes 111, the alternating current voltage output unit 121 that outputs the first alternating current voltage Vrx to the sensor electrodes 111, the alternating current voltage output unit 122 that applies, to the shield electrode 112, the second alternating current voltage Vas having the same frequency and phase as the first alternating current voltage Vrx and amplitude larger than that of the first alternating current voltage Vrx, the detection circuit 130 that detects the self-capacitances of the sensor electrodes 111, the adjustment electrodes 113 arranged close to the sensor electrodes 111, and the voltage setting units that set the adjustment electrodes 113 to the fixed potential Va.

Since the adjustment electrodes 113 capacitively coupled to the sensor electrodes 111 are provided and the adjustment electrodes 113 are set to the fixed potential (ground potential here) on an assumption that the amplitude Vas of the alternating current voltage applied to the shield electrode 112 is larger than the amplitude Vrx of the alternating current voltage applied to the sensor electrodes 111, an effect of drift in the capacitance between the sensor electrodes 111 and both the shield electrode 112 and the adjustment electrodes 113 due to changes in an environment including temperature and humidity can be suppressed.

A capacitive detection device 100 capable of suppressing an effect of drift in capacitance due to changes in an environment including temperature and humidity, therefore, can be provided.

In addition, when the amplitude of the first alternating current voltage is denoted by Vrx, the amplitude of the second alternating current voltage is denoted by Vas, the fixed potential is denoted by Va, the coupling capacitance between the sensor electrodes 111 and the shield electrode 112 is denoted by Crs, and the coupling capacitance between the sensor electrodes 111 and the adjustment electrodes 113 is denoted by Cra, the coupling capacitance Cra determined on the basis of the relational expression of Expression (1) is achieved between the sensor electrodes 111 and the adjustment electrodes 113. Since the coupling capacitance Cra between the sensor electrodes 111 and the adjustment electrodes 113 is adjusted in such a way as to satisfy the condition of Expression (1) so that the charges of the capacitors Crs and Cra cancel each other, a capacitive detection device 100 capable of more reliably suppressing an effect of drift in capacitance due to changes in an environment including temperature and humidity can be provided.

Since the fixed potential Va is the ground potential (Va=0 V), the adjustment electrodes 113 can be easily set to the fixed potential Va, and a capacitive detection device 100 capable of suppressing an effect of drift in capacitance due to changes in an environment including temperature and humidity with a simple configuration can be provided.

The sensor electrodes 111 are provided on the first surface (the surface in the +Z direction) of the insulation layer 115A, and the shield electrode 112 and the adjustment electrodes 113 are provided on the second surface (the surface in the −Z direction) of the insulation layer 115A opposite the first surface (the surface in the +Z direction). The first surface (the surface in the +Z direction) of the insulation layer 115A is located on a side on which the fingertip FT approaches the sensor electrodes 111. Even if a ground potential member or the like maintained at the ground potential is present in the −Z direction of the shield electrode 112, a capacitive detection device 100 capable of effectively suppressing an effect of the ground potential member or the like on the detection of the fingertip FT by the sensor electrodes 111 and more reliably and easily suppressing an effect of drift in capacitance due to changes in an environment including temperature and humidity can be provided.

Since the sensor electrodes 111, the shield electrode 112, and the adjustment electrodes 113 are provided on the wiring board having the multilayer structure and the shield electrode 112 and the adjustment electrodes 113 are provided in the same layer different from that of the sensor electrodes 111, inter-electrode distances between the shield electrode 112 and the sensor electrodes 111 and inter-electrode distances between the adjustment electrodes 113 and the sensor electrodes 111 can be made equal to each other, and the condition of Expression (1) can be easily set. A capacitive detection device 100 capable of more reliably and easily suppressing an effect of drift in capacitance due to changes in an environment including temperature and humidity, therefore, can be provided. When only capacitors based on the shield electrode 112 and the adjustment electrodes 113 are added, chip capacitors or the like may be provided outside the wiring board, for example, but in this case, it becomes difficult to make adjustments using Expression (1) because characteristics of changes in permittivity and the like due to changes in an environment including temperature and humidity are different between the wiring board and the chip capacitors. By providing the sensor electrodes 111, the shield electrode 112, and the adjustment electrodes 113 on the same wiring board, on the other hand, an effect of drift in capacitance due to changes in an environment including temperature and humidity becomes consistent, and a capacitive detection device 100 capable of more reliably and easily suppressing the effect can be provided.

Since the sensor electrodes 111 and the shield electrode 112 are arranged in such a way as to face each other and the sensor electrodes 111 and the adjustment electrodes 113 are arranged in such a way as to face each other, a capacitive detection device 100 capable of reliably setting the condition of Expression (1) and more reliably and easily suppressing an effect of drift in capacitance due to changes in an environment including temperature and humidity can be provided.

Since, in plan view, the first areas 111A in which the sensor electrodes 111 are provided are located within the second area 112A in which the shield electrode 112 is provided and the third areas 113A in which the adjustment electrodes 113 are provided are located within the first areas 111A and the second area 112A, a capacitive detection device 100 capable of reliably setting the condition of Expression (1) and more reliably and easily suppressing an effect of drift in capacitance due to changes in an environment including temperature and humidity can be provided.

Since the shield electrode 112 is provided on the second side of the sensor electrodes 111, which is opposite the first side in which the fingertip FT approaches the sensor electrodes 111, even if a ground potential member or the like maintained at the ground potential is present in the −Z direction of the shield electrode 112, a capacitive detection device 100 capable of effectively suppressing an effect of the ground potential member or the like on the detection of the fingertip FT by the sensor electrodes 111 and more reliably and easily suppressing an effect of drift in capacitance due to changes in an environment including temperature and humidity can be provided. In addition, since the shield electrode 112 and the adjustment electrodes 113 are provided on the second side of the sensor electrodes 111, which is opposite the first side in which the fingertip FT approaches the sensor electrodes 111, the shield electrode 112 and the adjustment electrodes 113 can be arranged at positions invisible to the user. In particular, by arranging the adjustment electrodes 113 behind the sensor electrodes 111, it is possible to suppress an increase in the coupling capacitance between the fingertip FT and the adjustment electrodes 113 caused by the approach of the fingertip FT. In this case, too, a capacitive detection device 100 capable of more reliably and easily suppressing an effect of drift in capacitance due to changes in an environment including temperature and humidity can be provided.

Although a mode in which the potential of the adjustment electrodes 113 is a fixed potential has been described, an alternating current voltage Va whose amplitude is smaller than the amplitude Vrx of the alternating current voltage applied to the sensor electrodes 111 and whose frequency and phase are the same as those of the alternating current voltage applied to the sensor electrodes 111 may be applied to the adjustment electrodes 113, instead. The alternating current voltage Va applied to the adjustment electrodes 113 in this manner is an example of a third alternating current voltage. The third alternating current voltage may be output from an alternating current voltage output unit (an example of a voltage setting unit) similar to the alternating current voltage output units 121 and 122. When an alternating current voltage whose amplitude is smaller than the amplitude Vrx of the alternating current voltage applied to the sensor electrodes 111 is applied, charge distribution similar to that in FIG. 5 can be caused in the sensor electrodes 111, the shield electrode 112, and the adjustment electrodes 113. By adjusting the coupling capacitance Cra between the sensor electrodes 111 and the adjustment electrodes 113 in such a way as to satisfy Expression (2), which is identical to Expression (1), therefore, a capacitive detection device 100 capable of more reliably and easily suppressing an effect of drift in capacitance due to changes in an environment including temperature and humidity can be provided.

$$Crs \times (Vas - Vrx) = Cra \times (Vrx - Va) \qquad (2)$$

When the amplitude of the first alternating current voltage is denoted by Vrx, the amplitude of the second alternating current voltage is denoted by Vas, amplitude of the third alternating current whose phase is the same as that of the first alternating current voltage is denoted by Va, the coupling capacitance Crs between the sensor electrodes 111 and the shield electrode 112 is denoted by Crs, and the coupling capacitance between the sensor electrodes 111 and the adjustment electrodes 113 is denoted by Cra, the coupling capacitance Cra determined on the basis of a relational expression of Expression (2) is achieved between the sensor electrodes 111 and the adjustment electrodes 113. Since the coupling capacitance Cra between the sensor electrodes 111 and the adjustment electrodes 113 is adjusted in such a way as to satisfy the condition of Expression (2) so that the charges of the capacitors Crs and Cra cancel each other, a capacitive detection device 100 capable of more reliably suppressing an effect of drift in capacitance due to changes in an environment including temperature and humidity can be provided.

Alternatively, an alternating current voltage whose frequency is the same as that of the alternating current voltage applied to the sensor electrodes 111 and whose phase is opposite to that of the alternating current voltage applied to the sensor electrodes 111 may be applied to the adjustment electrodes 113. This alternating current voltage having an opposite phase, too, is an example of the third alternating current voltage. When the alternating current voltage having the opposite phase is applied to the adjustment electrodes 113 as the third alternating current voltage, the amplitude of the third alternating current voltage need not be smaller than the amplitude Vrx of the alternating current voltage, and may be any amplitude. The third alternating current voltage may be output from an alternating current voltage output unit (an example of the voltage setting unit) similar to the alternating current voltage output units 121 and 122. In the case of the opposite phase, the coupling capacitance Cra between the sensor electrodes 111 and the adjustment electrodes 113 may be adjusted in such a way as to satisfy the following Expression (3), which is obtained by transforming Expression (2).

$$Crs \times (Vas - Vrx) = Cra \times (Vrx + Va) \qquad (3)$$

By applying the alternating current voltage having the opposite phase to the adjustment electrodes 113, the capacitor Cra can cancel more charge than when the charge distribution illustrated in FIG. 5 is established and the adjustment electrodes 113 are at the ground potential, and a capacitive detection device 100 capable of more effectively and reliably suppressing an effect of drift in capacitance due to changes in an environment including temperature and humidity can be provided.

When the amplitude of the first alternating current voltage is denoted by Vrx, the amplitude of the second alternating current voltage is denoted by Vas, the amplitude of the third alternating current voltage whose phase is opposite to that of the first alternating current voltage is denoted by Va, the coupling capacitance between the sensor electrodes 111 and the shield electrode 112 is denoted by Crs, and the coupling capacitance between the sensor electrodes 111 and the adjustment electrodes 113 is denoted by Cra, the coupling capacitance Cra determined on the basis of the relational expression of Expression (3) is achieved between the sensor electrodes 111 and the adjustment electrodes 113. Since the coupling capacitance Cra between the sensor electrodes 111 and the adjustment electrodes 113 is adjusted in such a way as to satisfy the condition of Expression (2) so that the charges of the capacitors Crs and Cra cancel each other, a capacitive detection device 100 capable of more reliably suppressing an effect of drift in capacitance due to changes in an environment including temperature and humidity can be provided.

Although a mode in which only the sensor electrodes 111 are provided on the upper surface of the insulation layer 115A has been described above, the shield electrode 112 surrounding the sensor electrodes 111 on the upper surface of the insulation layer 115A may be provided like the shield electrode 112 illustrated in FIG. 2B. By providing the shield electrode 112 around the sensor electrodes 111, coupling capacitance in relation to nearby metal members and the like having the ground potential can be reduced, and a capacitive detection device 100 capable of more reliably suppressing an effect of drift in capacitance due to changes in an environment including temperature and humidity can be provided.

<Modification of Adjustment Electrodes 113>

Figure 6:
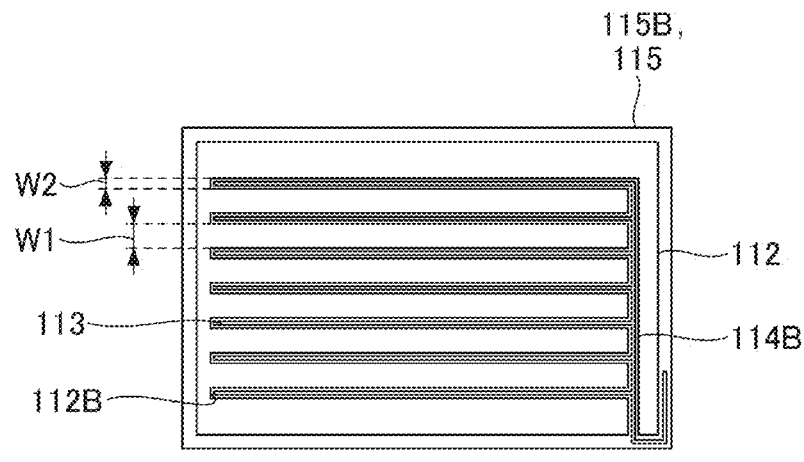
FIG. 6 is a diagram illustrating a modification of the adjustment electrodes.
Figure 6:
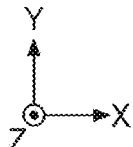

FIG. 6 is a diagram illustrating a modification of the adjustment electrodes 113. As with FIG. 2B, FIG. 6 illustrates a planar configuration of a part of the sensor unit 110 including the shield electrode 112, the adjustment electrodes 113, and the insulation layer 115B.

As illustrated in FIG. 6, the adjustment electrodes 113 may be a plurality of stripe electrodes extending along an X axis. In FIG. 6, ends, in a +X direction, of the seven adjustment electrodes 113 arranged in a Y direction are connected to one another by a wire 114B extending in the Y direction.

With the adjustment electrodes 113, the ratio of Crs: Cra=19:1 can be easily and accurately achieved by setting a ratio of a width W1 of the shield electrode 112 between the adjustment electrodes 113 to a width W2 of the adjustment electrodes 113 in the Y direction to 19:1.

Although a capacitive detection device according to an exemplary embodiment of the present disclosure has been described above, the present disclosure is not limited to the specifically disclosed embodiment, and may be modified or altered in various ways without deviating from the claims.

What is claimed is:

1. A capacitive detection device comprising:
   a sensor electrode;
   a shield electrode arranged in proximity to the sensor electrode;
   a first voltage output unit configured to output a first alternating current voltage to the sensor electrode;
   a second voltage output unit configured to apply, to the shield electrode, a second alternating current voltage having a frequency and a phase which are the same as a frequency and a phase of the first alternating current voltage and an amplitude larger than an amplitude of the first alternating current voltage;
   a detection unit configured to detect a self-capacitance of the sensor electrode;
   an adjustment electrode arranged in proximity to the sensor electrode; and
   a voltage setting unit configured to:
      output, to the adjustment electrode, a third alternating current voltage having a frequency and a phase which are the same as the frequency and the phase of the first alternating current voltage, and an amplitude smaller than the amplitude of the first alternating current voltage;

output, to the adjustment electrode, the third alternating current voltage having the frequency which is the same as the frequency of as the first alternating current voltage and a phase which is opposite to the phase of the first alternating current voltage; or set the adjustment electrode to a fixed potential, wherein the sensor electrode is provided on a first surface of an insulation layer, and wherein the shield electrode and the adjustment electrode are provided on a second surface of the insulation surface opposite the first surface.

2. The capacitive detection device according to claim 1, wherein, when the adjustment electrode is set to the fixed potential, and when the amplitude of the first alternating current voltage is denoted by Vrx, the amplitude of the second alternating current voltage is denoted by Vas, the fixed potential is denoted by Va, a coupling capacitance between the sensor electrode and the shield electrode is denoted by Crs, and a coupling capacitance between the sensor electrode and the adjustment electrode is denoted by Cra, the coupling capacitance Cra is determined such that following Expression (1) is achieved:

$$Crs \times (Vas - Vrx) = Cra \times (Vrx - Va). \qquad (1)$$

3. The capacitive detection device according to claim 2, wherein the fixed potential is a ground potential.

4. The capacitive detection device according to claim 1, wherein, when the third alternating current voltage has the phase which is the same as that of the first alternating current voltage, and when the amplitude of the first alternating current voltage is denoted by Vrx, the amplitude of the second alternating current voltage is denoted by Vas, the amplitude of the third alternating current voltage is denoted by Va, a coupling capacitance between the sensor electrode and the shield electrode is denoted by Crs, and a coupling capacitance between the sensor electrode and the adjustment electrode is denoted by Cra, the coupling capacitance Cra is determined such that following Expression (2) is achieved:

$$Crs \times (Vas - Vrx) = Cra \times (Vrx - Va). \qquad (2)$$

5. The capacitive detection device according to claim 1, wherein, when the third alternating current voltage has the phase which is opposite to that of the first alternating current voltage, and when the amplitude of the first alternating current voltage is denoted by Vrx, the amplitude of the second alternating current voltage is denoted by Vas, the amplitude of the third alternating current voltage is denoted by Va, a coupling capacitance between the sensor electrode and the shield electrode is denoted by Crs, and a coupling capacitance between the sensor electrode and the adjustment electrode is denoted by Cra, the coupling capacitance Cra is determined such that following Expression (3) is achieved:

$$Crs \times (Vas - Vrx) = Cra \times (Vrx + Va). \qquad (3)$$

6. The capacitive detection device according to claim 1, wherein the sensor electrode, the shield electrode, and the adjustment electrode are provided in a wiring board having a multilayer structure including a plurality of layers, such that the sensor electrode is provided on one of the plurality of layers, while the shield electrode and the adjustment electrode are both provided on another layer different from the one layer.

7. The capacitive detection device according to claim 1, wherein the sensor electrode and the shield electrode are arranged to face each other, and the sensor electrode and the adjustment electrode are arranged to face each other.

8. The capacitive detection device according to claim 1, wherein, in plan view, a first area in which the sensor electrode is provided is located within a second area in which the shield electrode is provided, and a third area in which the adjustment electrode is provided is located within the first area and the second area.

9. A capacitive detection device comprising:

a sensor electrode;

a shield electrode arranged in proximity to the sensor electrode;

a first voltage output unit configured to output a first alternating current voltage to the sensor electrode;

a second voltage output unit configured to apply, to the shield electrode, a second alternating current voltage having a frequency and a phase which are the same as a frequency and a phase of the first alternating current voltage and an amplitude larger than an amplitude of the first alternating current voltage;

a detection unit configured to detect a self-capacitance of the sensor electrode;

an adjustment electrode arranged in proximity to the sensor electrode; and a voltage setting unit configured to:

output, to the adjustment electrode, a third alternating current voltage having a frequency and a phase which are the same as the frequency and the phase of the first alternating current voltage, and an amplitude smaller than the amplitude of the first alternating current voltage;

output, to the adjustment electrode, the third alternating current voltage having the frequency which is the same as the frequency of as the first alternating current voltage and a phase which is opposite to the phase of the first alternating current voltage; or set the adjustment electrode to a fixed potential, wherein a detection target approaches from a first side of the sensor electrode, and wherein the shield electrode and the adjustment electrode are provided on a second side of the sensor electrode opposite to the first side.

10. The capacitive detection device according to claim 9, wherein, when the adjustment electrode is set to the fixed potential, and when the amplitude of the first alternating current voltage is denoted by Vrx, the amplitude of the second alternating current voltage is denoted by Vas, the fixed potential is denoted by Va, a coupling capacitance between the sensor electrode and the shield electrode is denoted by Crs, and a coupling capacitance between the sensor electrode and the adjustment electrode is denoted by Cra, the coupling capacitance Cra is determined such that following Expression (1) is achieved:

$$Crs \times (Vas - Vrx) = Cra \times (Vrx - Va). \quad (1)$$

11. The capacitive detection device according to claim 10, wherein the fixed potential is a ground potential.

12. The capacitive detection device according to claim 9, wherein, when the third alternating current voltage has the phase which is the same as that of the first alternating current voltage, and when the amplitude of the first alternating current voltage is denoted by Vrx, the amplitude of the second alternating current voltage is denoted by Vas, the amplitude of the third alternating current voltage is denoted by Va, a coupling capacitance between the sensor electrode and the shield electrode is denoted by Crs, and a coupling capacitance between the sensor electrode and the adjustment electrode is denoted by Cra, the coupling capacitance Cra is determined such that following Expression (2) is achieved:

$$Crs \times (Vas - Vrx) = Cra \times (Vrx - Va). \quad (2)$$

13. The capacitive detection device according to claim 9, wherein, when the third alternating current voltage has the phase which is opposite to that of the first alternating current voltage, and when the amplitude of the first alternating current voltage is denoted by Vrx, the amplitude of the second alternating current voltage is denoted by Vas, the amplitude of the third alternating current voltage is denoted by Va, a coupling capacitance between the sensor electrode and the shield electrode is denoted by Crs, and a coupling capacitance between the sensor electrode and the adjustment electrode is denoted by Cra, the coupling capacitance Cra is determined such that following Expression (3) is achieved:

$$Crs \times (Vas - Vrx) = Cra \times (Vrx + Va). \quad (3)$$

14. The capacitive detection device according to claim 9, wherein the sensor electrode, the shield electrode, and the adjustment electrode are provided in a wiring board having a multilayer structure including a plurality of layers, such that the sensor electrode is provided on one of the plurality of layers, while the shield electrode and the adjustment electrode are both provided on another layer different from the one layer.

15. The capacitive detection device according to claim 9, wherein the sensor electrode and the shield electrode are arranged to face each other, and the sensor electrode and the adjustment electrode are arranged to face each other.

16. The capacitive detection device according to claim 9, wherein, in plan view, a first area in which the sensor electrode is provided is located within a second area in which the shield electrode is provided, and a third area in which the adjustment electrode is provided is located within the first area and the second area.

* * * * *